United States Patent

Takagaki et al.

[11] Patent Number: 5,543,007
[45] Date of Patent: Aug. 6, 1996

[54] FILTER ELEMENT MANUFACTURING METHOD

[75] Inventors: Takanari Takagaki, Nagoya; Yasuo Nagai, Kariya, both of Japan

[73] Assignee: Nippondenso Co. Ltd., Kariya, Japan

[21] Appl. No.: 417,762

[22] Filed: Apr. 6, 1995

Related U.S. Application Data

[62] Division of Ser. No. 77,525, Jun. 16, 1993, Pat. No. 5,435,870.

[30] Foreign Application Priority Data

Jun. 17, 1992 [JP] Japan ................... 4-184505
Feb. 25, 1993 [JP] Japan ................... 5-049984

[51] Int. Cl.⁶ ................................................ B31C 1/00
[52] U.S. Cl. ................ 156/189; 156/184; 156/192; 156/291; 210/493.4; 210/494.1; 210/497.1
[58] Field of Search ........................... 156/184, 189, 156/192, 291; 53/119; 210/493.4, 494.1, 497.1; 493/299

[56] References Cited

U.S. PATENT DOCUMENTS

| | | |
|---|---|---|
| 1,166,737 | 1/1916 | Baird .......................................... 53/119 |
| 1,562,610 | 11/1925 | Baird .......................................... 53/119 |
| 2,502,545 | 4/1950 | Wellborn ........................... 210/494.1 X |
| 2,599,604 | 6/1952 | Bauer et al. . |
| 3,869,325 | 3/1975 | Witzig ....................................... 156/192 |
| 5,002,666 | 3/1991 | Matsumoto et al. . |
| 5,049,326 | 9/1991 | Matsumoto et al. . |
| 5,100,496 | 3/1992 | Mitchell ................................... 156/446 |
| 5,174,895 | 12/1992 | Drori ................................ 210/497.1 X |

FOREIGN PATENT DOCUMENTS 2126907 5/1990 Japan .
4131106 5/1992 Japan .

Primary Examiner—Mark A. Osele
Attorney, Agent, or Firm—Cushman, Darby & Cushman

[57] ABSTRACT

A method for manufacturing filter elements, in which sealant does not get onto the rolling claw and rolling of the roll filter paper is made easy. A long roll filter paper having laterally oriented filter parts for filtering, the filter parts being open on the inflow side of the roll filter paper and closed on the outflow side of the roll filter paper, is rolled. During rolling, a sealant is applied to the surface of the roll filter paper in a narrow longitudinal strip, in such a way that the sealant does not make contact with the rolling claw. The roll-start end of the roll filter paper is gripped with the rolling claw during rolling. The rolling claw is made up of 2 or 4 rolling bars having the shape of the parts produced when a cylinder is split into two halves along its axis.

4 Claims, 15 Drawing Sheets

5,543,007

FILTER ELEMENT MANUFACTURING METHOD

This is a division of application Ser. No. 08/777,525, filed Jun. 16, 1993 now U. S. Pat. No. 5,435,870.

BACKGROUND OF THE INVENTION

1. Field of the Invention

This invention relates to a manufacturing method for manufacturing filter elements for use in oil filters and air cleaners, etc., and more particularly relates to a method for rolling a roll filter paper.

2. Description of the Related Art

Cars are fitted with fuel filters for removing dirt from the fuel supplied to the engine.

The fuel filter is disposed, as shown in FIG. 22, in the fuel supply line 90 which supplies the fuel 6 to the engine. The fuel filter 9 is made up of a filter case 91, a cover 92 fitted to the top part of the filter case 91, and a filter element 1 contained inside the filter case 91. The fuel 6 enters the fuel filter 9 through an entry opening 920 centrally located in the cover 92, is filtered by the filter element 1, exits through an exit opening 930 centrally located in the base of the filter case 91, and is supplied to the engine (not shown in the drawings).

One example of a type of filter element used for the filter element 1 consists of a porous roll filter paper 10 of corrugated construction which has been rolled into a cylindrical shape, as shown in FIGS. 24–26 (Japanese Laid-Open Patent Publication No.H.4-131106).

The roll filter paper 10 is made up of two layers; a flat sheet 15 and a corrugated sheet 13. Hollow filter parts 14 are formed between the ridges 139 of the corrugated sheet 13 and the flat sheet 15. The troughs 131 of the corrugated sheet 13 are bonded to the flat sheet 15 by a sealant 2. The cavities formed by the corrugated sheet 13 other than the filter parts 14, in other words the cavities on the opposite side of the corrugated sheet 13 from the filter parts 14, are clean parts 16.

In each of the filter parts 14, as shown in FIGS. 22, 23 & 26, the inflow end 71 is open. The outflow end 79, however, is closed off by the ridges 139 of the corrugated sheet 13 being squeezed together with and joined to the flat sheet 15.

In each of the clean parts 16, on the other hand, the inflow end 71 is closed off by the sealant 2, and the outflow end 79 is open.

In this filter element 1, the fuel 6 enters the filter parts 14 through the inflow end 71 and passes through the porous roll filter paper 10 from the filter parts 14 into the clean parts 16. The dirt contained in the fuel 6 is trapped on the surface of the roll filter paper 10 on the filter part 14 side.

Filters similar to the filter element 1 discussed above are used in other filters, such as air filters and the like, as well as automobile fuel filters.

The method by which the filter element discussed above is manufactured will now be explained, with reference to FIG. 27.

First, the troughs 131 of a corrugated sheet 13 are bonded to a flat sheet 15, the ridges 139 of the corrugated sheet 13 at the outflow end 79 are squashed, and a long corrugated roll filter paper 10 is obtained. Then, the sealant 2 is applied to the inner surface of the roll filter paper 10 at the inflow end 71 side of the roll filter paper 10, in a narrow strip extending along the length of the roll filter paper 10 from the roll-start end 17. The roll filter paper 10 is then rolled up along its length, from the roll-start end 17 to the roll-finish end 19.

Conventionally this rolling operation is carried out by hand or using a rolling claw.

However, rolling by hand requires a lot of manpower and is time-consuming, and considerable practice is necessary in order to master the rolling operation.

When a rolling claw 30 is used to roll up the roll paper filter 10, the roll-start end of the roll paper filter 10 is gripped in the rolling claw 30, the sealant 2 is applied in a narrow strip along the inflow side 71, and after that the rolling claw 30 is rotated and the roll paper filter is rolled up. However, in the process, as shown in FIG. 28, the sealant 2 gets onto the rolling claw 30, and this can result in it being impossible to remove the rolling claw 30 from the roll filter paper 10 on completion of rolling.

SUMMARY OF THE INVENTION

This invention was devised in response to these problems associated with conventional methods, and offers a method of manufacturing filter elements in which the sealant does not get onto the member used as the rolling core and in which rolling of the roll filter paper is made easy.

In this invention a manufacturing method for manufacturing filter elements obtained by rolling a roll filter paper which has latitudinally oriented filter parts, open at one end and closed at the other, for filtering, is characterized by the steps of gripping the roll filter paper near the roll-start end, applying a sealant to the surface of the roll filter paper in a narrow strip along the length of the roll filter paper, rolling the roll filter paper with the rolling claw, and removing the rolling claw after rolling is completed.

The above-mentioned roll filter paper is long; the direction of the longer dimension will hereinafter be referred to as the longitudinal direction, and the direction of the shorter dimension will hereinafter be referred to as the latitudinal direction. The roll filter paper is provided with latitudinally oriented filter parts into which a fluid flows.

In this invention, for the rolling claw, for example a cylinder split along its axis into two rolling bars is used. The rolling bars each have a gripping face for gripping the roll filter paper. Several different types of rolling claw exist, for example: full grip types which grip the whole roll-start end of the roll filter paper, from the inflow side to the outflow side; outflow side grip types which grip the roll-start end without gripping the inflow side; and side grip types which grip both sides but do not grip the middle part of the roll filter paper.

It is desirable that the above-mentioned sealant be applied from the roll-start end to the roll-finish end continuously in one pass, without any stoppages. This allows the roll filter paper to be rolled up in a short time, without any stoppages.

An adhesive such as a hot melt adhesive or an epoxy adhesive may be used as the sealant. The roll filter paper is a porous filtering material which may be any suitable material such as a filter paper, a non-woven material, or a woven synthetic fiber material.

A filter element made according to this invention is fitted into a vehicle fuel filter, an air cleaner or the like, and functions as a fluid filter. The fluid being cleaned by the filter element is either a liquid, such as fuel, or a gas, such as air.

In this invention the roll-start end of the roll filter paper is gripped by a rolling claw, and also the sealant is applied and positioned in such a way that the sealant does not make contact with the rolling claw during rolling of the roll filter paper. As a result of this, the sealant does not get onto the rolling claw during rolling of the roll filter paper. This facilitates the rolling operation and improves production efficiency.

As described above, this invention provides a method for manufacturing filter elements in which sealant does not get onto the rolling claw and rolling of the roll filter paper is easy.

DETAILED DESCRIPTION OF THE PREFERRED EMBODIMENTS

1st Embodiment

A first preferred embodiment of this invention will now be described, with reference to FIGS. 1–4. This preferred embodiment is a method for manufacturing a filter element 1 by rolling a roll filter paper 10 into a scroll.

Figure 1:
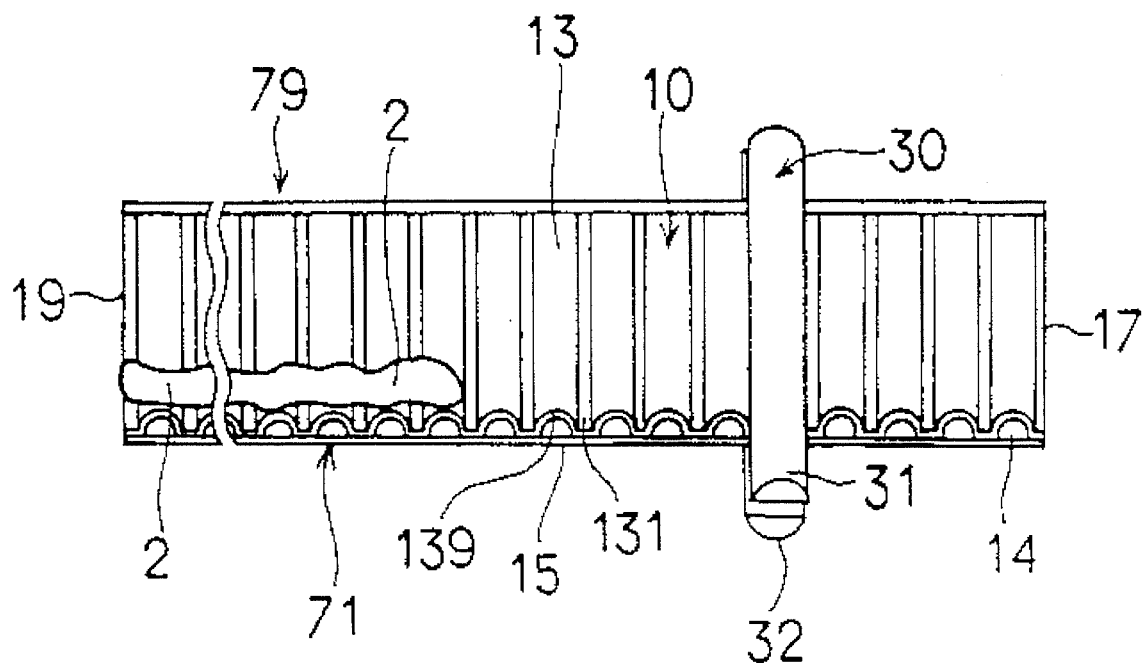
FIG. 1 is a view illustrating a method for rolling roll filter paper according to a 1st preferred embodiment of the present invention.

A roll filter paper 10, as shown in FIG. 1, is made up of two layers: a flat sheet 15 and a corrugated sheet 13. Hollow filter parts 14 are formed between the ridges 139 of the corrugated sheet 13 and the flat sheet 15. Clean parts 16 are formed on the opposite side of the corrugated sheet 13 from the filter parts 14 (see FIG. 25).

Figure 4:
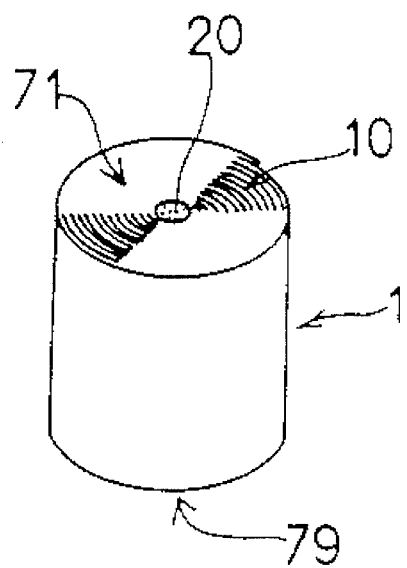
FIG. 4 is a perspective view of a filter element made according to the 1st preferred embodiment.

As shown in FIG. 4, the filter element 1 is cylindrical in shape, with one end of the cylinder being the fluid inflow end 71 and the other end of the cylinder being the fluid outflow end 79.

Figure 25:
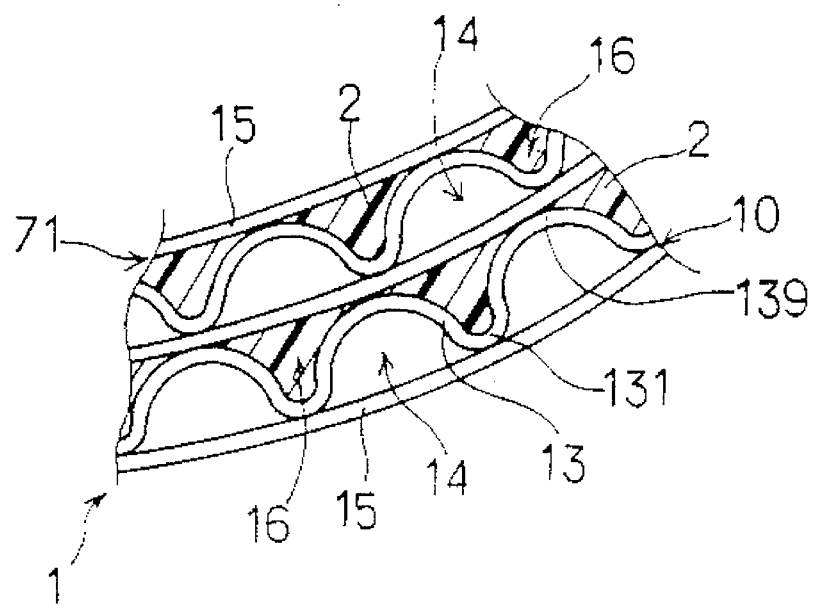
FIG. 25 is an enlarged view of a representative part of the inflow end of a conventional filter element.
Figure 26:
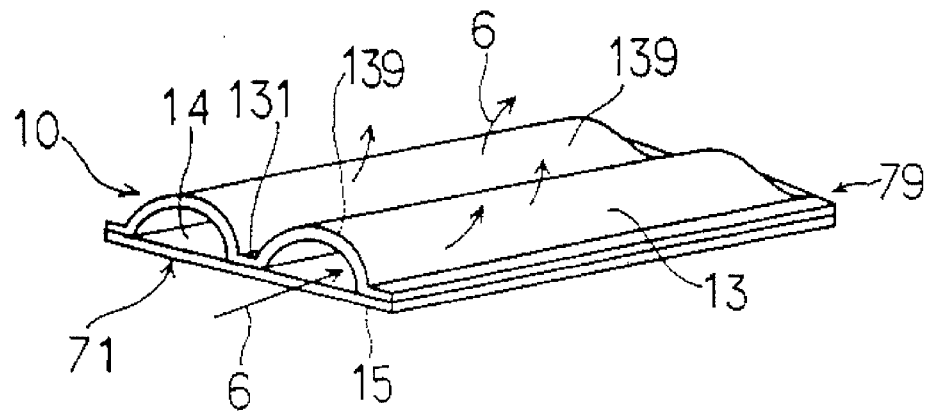
FIG. 26 is a perspective view of a representative part of a conventional roll filter paper.
Figure 27:
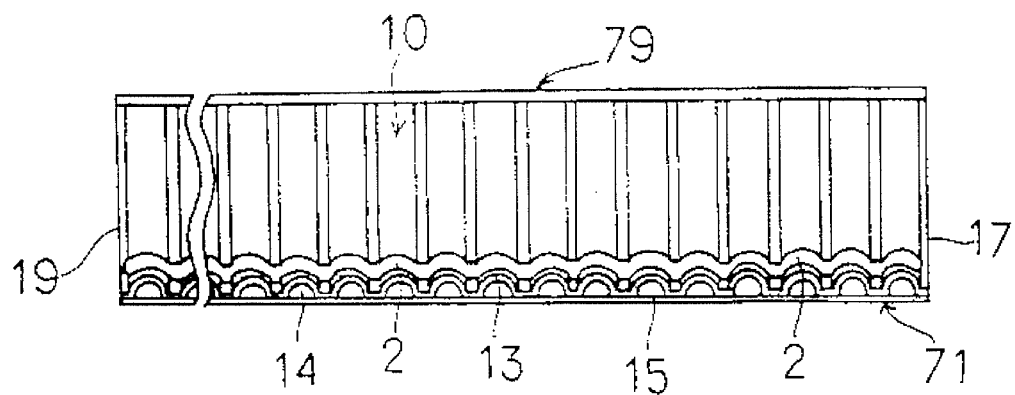
FIG. 27 is a view illustrating a first conventional roll filter rolling method.
Figure 28:
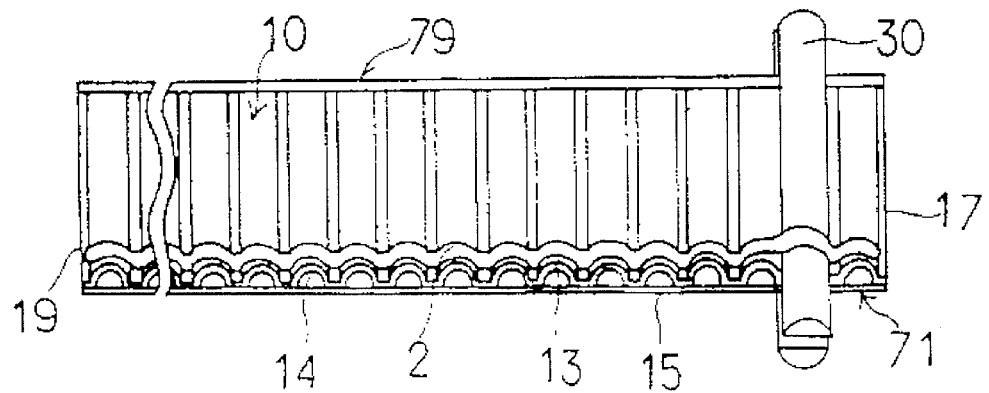
FIG. 28 is a view illustrating a second conventional roll filter rolling method.

At the inflow end 71, the filter parts 14 are open, and the clean parts 16 are closed off by a non-porous sealant (see FIG. 25). At the outflow end 79, the filter parts 14 are closed off, and the cleaning parts 16 are open (see FIG. 26).

A non-porous hot melt adhesive is used for the sealant 2. Porous filter paper is used for the roll filter paper 10.

Next, the manufacturing method for manufacturing the filter element discussed above will be described, with reference to FIGS. 1–4.

First, as shown in FIG. 1, a roll filter paper 10 of corrugated construction is obtained by bonding the troughs 131 of a corrugated sheet 13 to a flat sheet 15. Next, the ridges 139 on the outflow side 79 of the corrugated sheet 13 are squashed against the surface of the flat sheet 15. Then, the roll-start end 17 of the roll filter paper 10 is gripped with a rolling claw 30.

Figure 2:
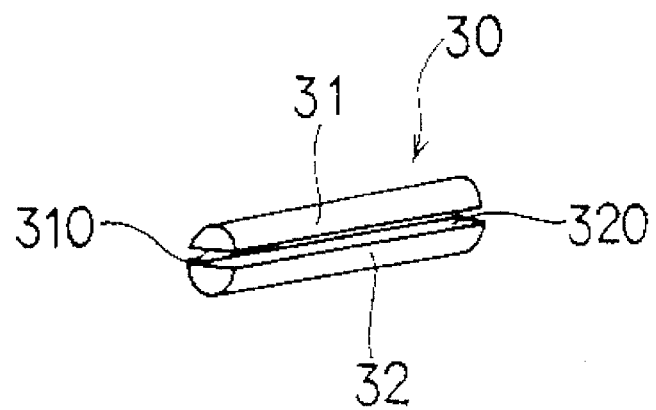
FIG. 2 is a perspective view of the rolling claw used in the 1st preferred embodiment.

As shown in FIG. 2, the rolling claw 30 is a full grip type which grips the roll-start end across the entire width of the roll filter paper 10. The rolling claw is made up of two rolling bars 31 and 32. The rolling bars 31 and 32 have flat gripping surfaces 310 and 320, and have the form of a cylindrical bar split axially into two halves. In gripping the roll filter paper 10 with this rolling claw 30, the gripping faces 310,320 grip the roll-start end 17 of the roll filter paper 10.

Figure 3:
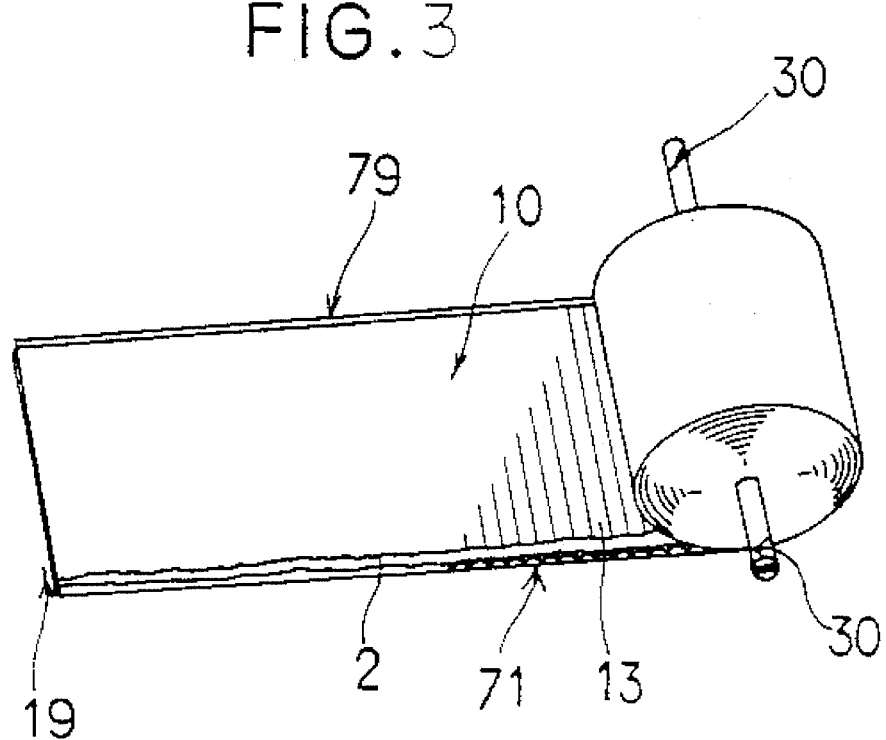
FIG. 3 is a view illustrating the continuation of the roll filter paper rolling method of FIG. 1.

Next, as shown in FIGS. 1 & 3, while sealant 2 is applied to the inner surface of the roll filter paper in a narrow strip extending longitudinally along the roll filter paper 10 from a point at which it does not make contact with the rolling claw 30, the roll filter paper 10 is rolled up using the rolling claw 30.

After that, as shown in FIG. 4, the rolling claw 30 is removed from the roll filter paper 10, and a sealant 20 is applied at the inflow end 71 to the cylindrical cavity created by the removal of the rolling claw 30. In this way the filter element 1 is formed.

Next, the operating effects of this embodiment will be explained. In this embodiment, as shown in FIG. 1, the roll-start end portion 17 of the roll filter paper 10 is gripped by the rolling claw 30, and also, during rolling of the roll filter paper 10, the sealant 2 is applied in such a position that it does not make contact with the rolling claw 30. As a result of this, during rolling of the roll filter paper 10, the sealant 2 does not get onto the rolling claw 30. Because of this, production efficiency is good, and costs can be reduced.

Also, in this embodiment, all the clean parts 16 on the inflow side 17 can be blocked off by the sealant 2 and the sealant 20. This makes it possible for the fluid to be efficiently filtered by the whole surface of the roll filter paper 10.

2nd Embodiment

Figure 5:
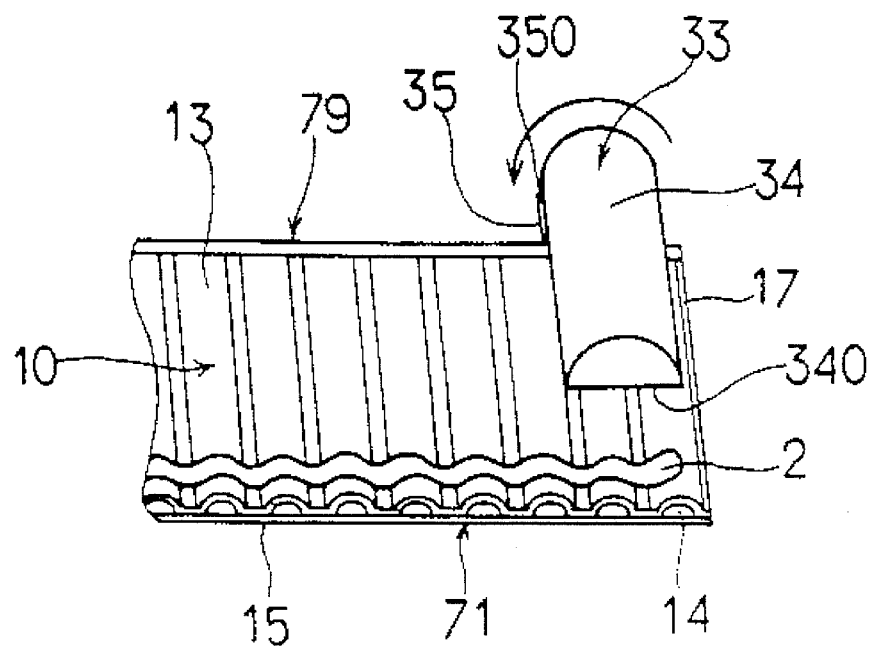
FIG. 5 is a view illustrating a roll filter paper rolling method according to a 2nd preferred embodiment.

In this embodiment, as shown in FIG. 5, an outflow side grip type rolling claw 33 which grips the roll-start portion 17 without gripping the inflow side 71 of the roll filter paper 10 is used.

The rolling claw 33 is made up of two rolling bars 34 and 35 in the same way as in the 1st embodiment.

In manufacturing a filter element according to this embodiment, all but the inflow side 71 of the roll-start end 17 of the roll filter paper 10 is gripped by the rolling claw 33.

In gripping the roll filter paper 10 with the rolling claw 33, the gripping faces 340 and 350 are faced toward each other and approximately half of the roll-start end 17 of the roll filter paper 10 is gripped with the rolling bars 34 and 35.

Next, while sealant 2 is applied, in a narrow strip, from the roll-start end 17 to the roll-finish end 19, rolling is performed using the rolling claw 33.

After that, the rolling claw 33 is removed from the roll filter paper 10.

The rest of the manufacturing process is as per the 1st embodiment.

In this preferred embodiment, because all but the inflow side 71 of the roll-start end 17 of the roll filter paper 10 is gripped by the outflow side grip type rolling claw 33, it is possible to apply the sealant 2 to the whole length of the inflow side 71, from the roll-start end 17 to the roll-finish end 19. As a result of this, it is not necessary to apply the sealant 20 as in the 1st embodiment, a filter in which the filter parts and the clean parts are in contact throughout can be made, and the cleaning efficiency can be further increased.

This embodiment also offers the benefits provided by the 1st embodiment.

3rd Embodiment

In this embodiment, as shown in FIGS. 6–9, side grip type rolling claws 36 which grip the sides of the roll filter paper 10 but do not grip the center are used. The rolling claws 36 are made up of four rolling bars 37,38,39,40.

In making the above-mentioned filter element, first, the rolling bars 37,38, with opposing gripping surfaces 370,380, are used to grip the outflow side 79 of the roll-start end 17, and the rolling bars 39,40, with gripping faces 390,400, are used to grip the inflow side 71 of the roll-start end 17.

Figure 6:
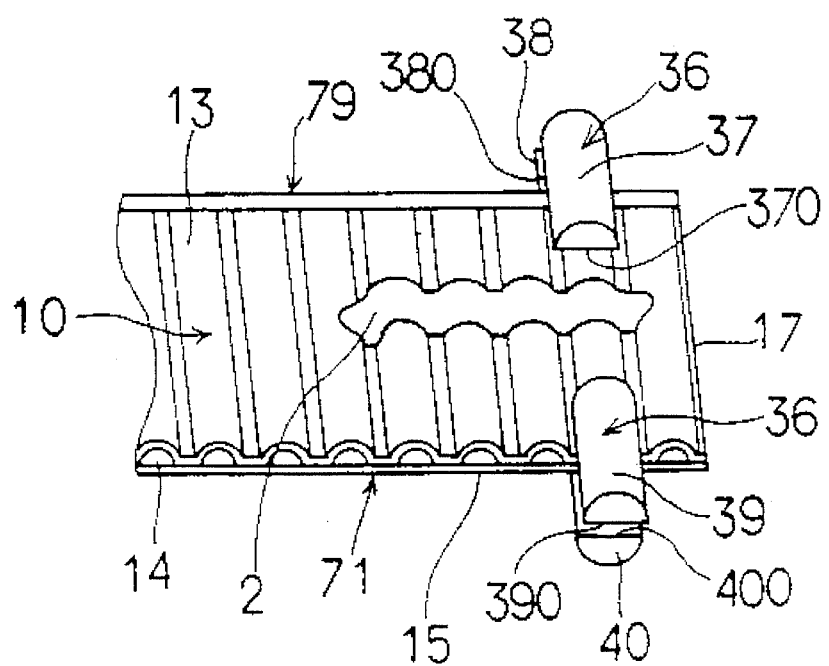
FIG. 6 is a view illustrating a roll filter paper rolling method according to a 3rd preferred embodiment.

Then, as shown in FIG. 6, the sealant 2 is applied in a narrow strip longitudinally along the center of the inner surface of the roll-start end 17 of the roll filter paper 10, without any sealant making contact with the rolling claws 36. The length of the strip of the sealant 2 that is applied at this stage is such that when the roll-start end 17 of the roll filter paper has been rolled by the rolling claws 36 through half a revolution, a small portion of the sealant will be exposed.

Figure 7:
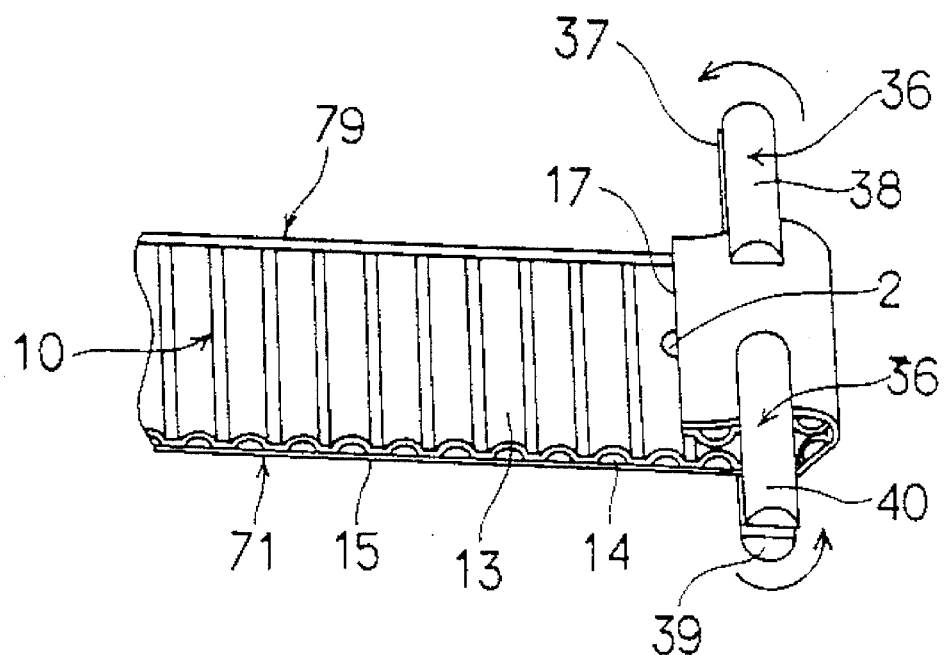
FIG. 7 is a view illustrating the continuation of the roll filter rolling method of FIG. 6.

Next, as shown in FIG. 7, the roll filter paper 10 is rolled by the rolling claws 36 through half a revolution, longitudinally from the roll-start end 17. This leaves a small portion of the sealant 2 exposed, projecting out from under the rolled portion of the roll-start end 17.

Figure 8:
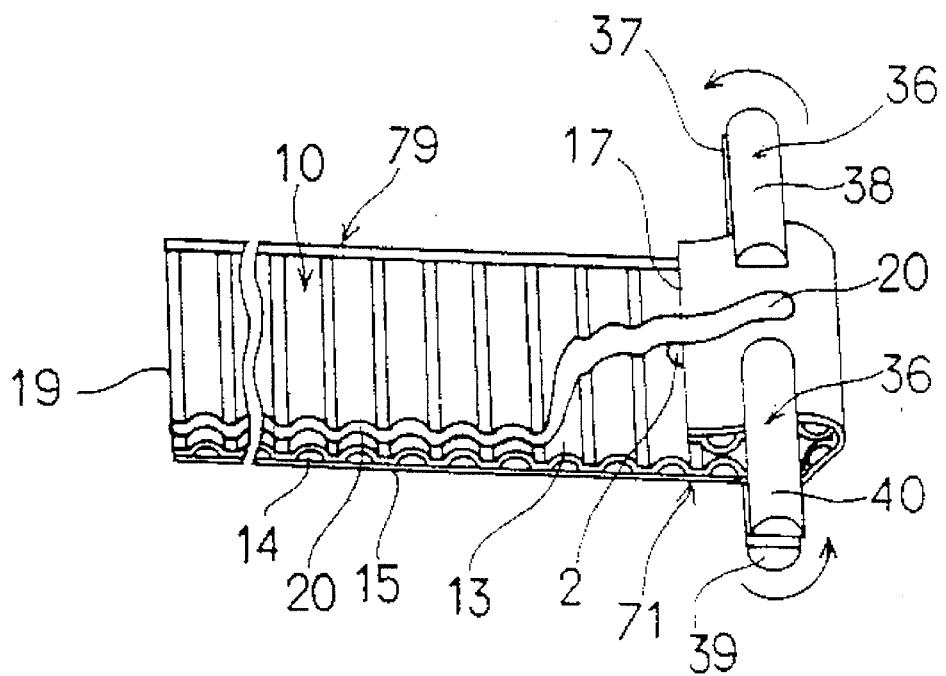
FIG. 8 is a view illustrating the continuation of the roll filter rolling method of FIG. 7.

Then, as shown in FIG. 8, the sealant 20 is applied between the two claws 36 and over the above-mentioned projecting portion of the sealant 2. And, while the sealant 20 is laid so that it forms a curve running over to the inflow side 71 and then a straight line running along the inflow side 71 to the roll-finish end 19, the roll filter paper is rolled in the same way as in the 1st embodiment, and the rolling claws are removed from the roll filter paper 10.

Figure 9:
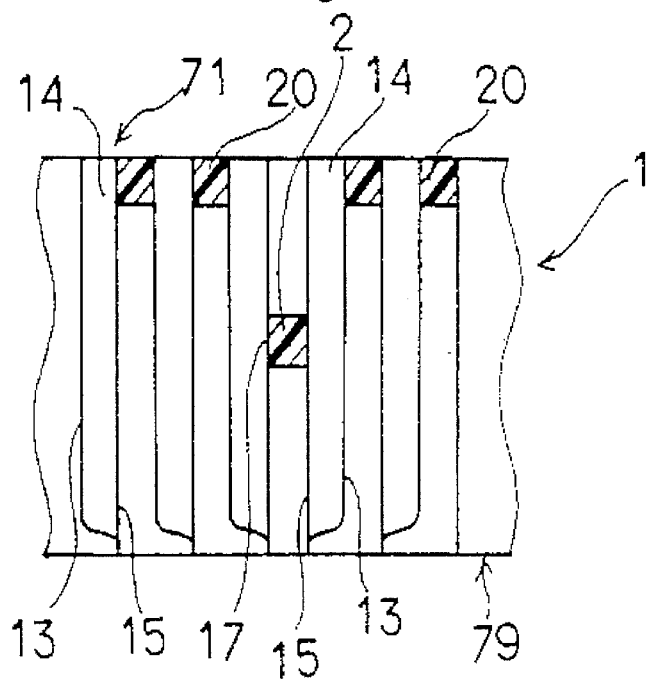
FIG. 9 is a cross-sectional view of a representative part of a filter element made according to the 3rd preferred embodiment.

In this way, a filter element 1 as shown in FIG. 9 is formed. In the region near the roll-start end 17, the sealant 2 is positioned centrally. Everywhere else, the sealant 2 is positioned as in the 1st embodiment.

In this preferred embodiment, side grip type rolling claws 36 are used to grip the sides of the roll-start end 17 of the roll filter paper 10 without gripping the central part, the part of the roll filter paper 10 that lies between the rolling bars 37,39 is sealed by the sealant 2, and the part between the rolling bars 38,40 is blocked of by the sealant 20 (see FIG. 9). As a result, there is no need to apply sealant after the rolling claw is removed from the roll filter paper 10, as is necessary in the 1st embodiment.

Also, in the 2nd preferred embodiment, because the rolling claw has to be made long enough to grip about half of the roll-start end 17 of the roll filter paper 10, the strength of the rolling claw has to be increased accordingly. This results in the thickness of the rolling claw itself being greater. In the 3rd embodiment, however, because the roll filter paper 10 is held by the rolling claws on both sides, the rolling claws can be short. Because the rolling claws can be short, they do not have to be as strong, and the thickness of the rolling claws can be reduced to substantially below the thickness required of the rolling claw of the 2nd embodiment. As a result, rolling of the roll filter paper 10 can be carried out better than with the 2nd embodiment.

Furthermore, this 3rd embodiment also offers the benefits of the 1st embodiment.

4th Embodiment

Figure 10:
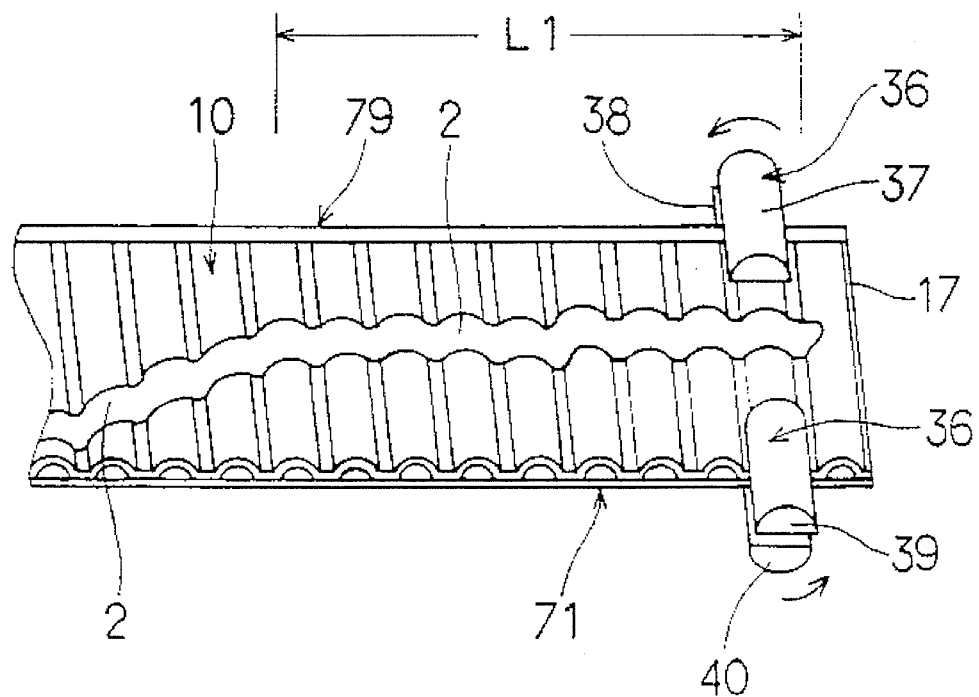
FIG. 10 is a view illustrating a roll filter paper rolling method according to a 4th preferred embodiment.

In this embodiment, as shown in FIG. 10, the roll filter paper is gripped at both sides, but not in the middle, by the rolling claws 36. And, with the roll filter paper 10 held in this way, the sealant 2 is applied in such a way that it forms a curve running gradually from the central part of the roll-start end 17 over to the inflow side 71, and then runs along the inflow side to the roll-finish end 19. The length L1 of the strip of sealant applied to the central part corresponds to approximately one rotation of the rolling claws 36.

Then, the rolling claws 36 are rotated until the roll filter paper is completely rolled. After that, the rolling claws 36 are removed from the roll filter paper 10.

Other details of this embodiment are as per the 1st embodiment.

In this embodiment, the sealant 2 is applied in one continuous pass, without stopping, from the roll-start end 17 to the roll-finish end 19. As a result, it is not necessary, as it is in the 3rd embodiment, to change the sealant application position mid-way through the rolling process. This makes it possible for the roll filter paper 10 to be rolled from the roll-start end 17 all the way to the roll-finish end without stopping.

Therefore, in this embodiment, a filter element can be made in a short space of time.

This embodiment also provides the same benefits as those of the 3rd embodiment.

5th Embodiment

Figure 11:
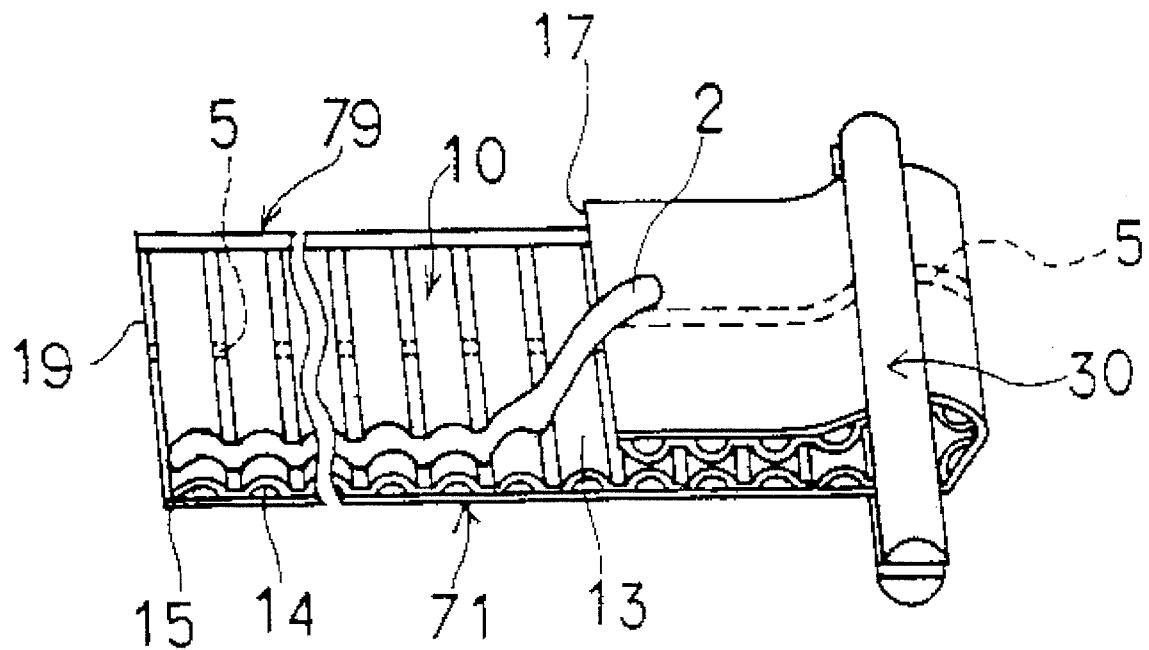
FIG. 11 is a view illustrating a roll filter paper rolling method according to a 5th preferred embodiment.
Figure 12:
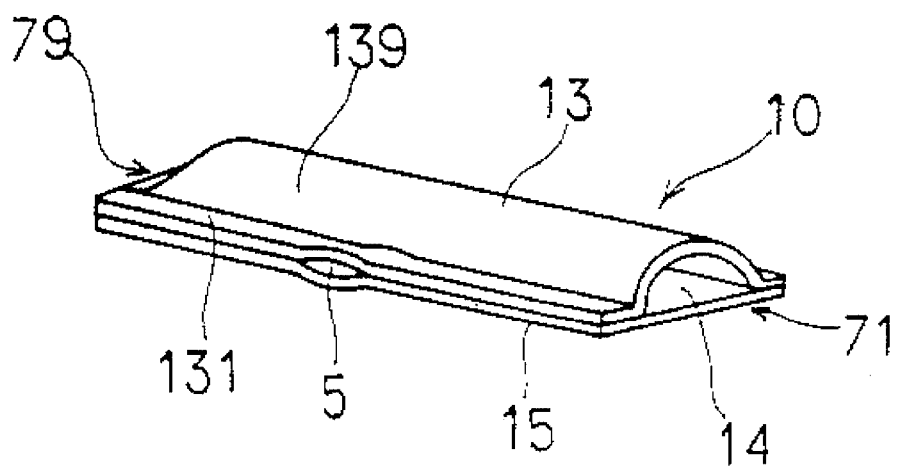
FIG. 12 is a perspective view of a representative part of the roll filter paper used in the 5th preferred embodiment.
Figure 13:
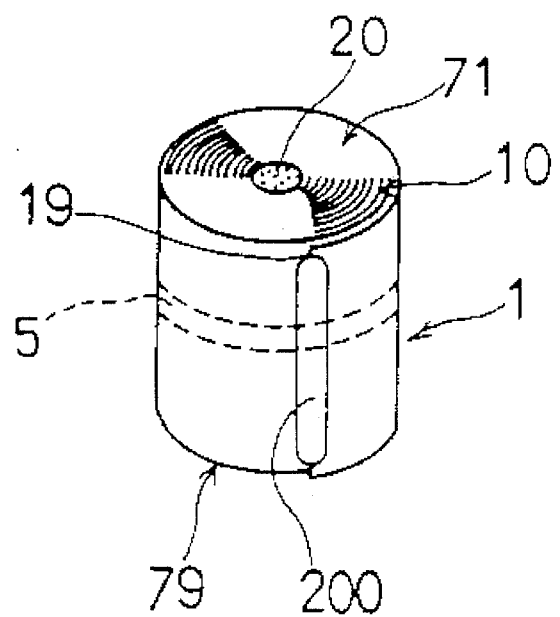
FIG. 13 is a perspective view of a filter element made according to the 5th preferred embodiment.

In this embodiment, as shown in FIGS. 11–13, a roll filter paper 10 which has an unseparated part 5, positioned longitudinally near the centerline of the roll filter paper, is used. The unseparated part 5, as shown in FIG. 12, is a region in which parts of the troughs 131 of the corrugated sheet 13 are not adhered to the flat sheet 15.

In rolling the roll filter paper 10, as shown in FIG. 11, a full grip type rolling claw 30 as used in the 1st embodiment is used.

In making the filter element, the roll-start end 17 of the roll filter paper 10 is gripped, and the roll filter paper 10 is rolled through half a revolution using the rolling claw 30.

Next, the unseparated region 5 at the roll-start end 17 is blocked using she sealant 2, and the sealant 2 is applied so that it curves toward the inflow side 71. And, without stopping, while the sealant 2 is applied along the inflow side 71 all the way to the roll-finish end 19, the roll filter paper 10 is rolled up to the roll-finish end 19.

After that, the rolling claw 30 is removed from the roll filter paper 10, and, as shown in FIG. 13, the gaps created by the removal of the rolling claw 30 are filled in with the sealant 20 on the inflow side 71. Also, the sealant 200 is applied to the entire length of the roll-finish end 19, including the unseparated region 5. This completes the filter element 1.

Other details of this embodiment are as per the 1st embodiment.

In this embodiment, the roll filter paper 10 is provided with an unseparated region 5. As a result, during filtering of a fluid, the fluid can move freely from one part of the filter part 14 to another. This prevents the occurrence of blockages caused by dirt contained in the fluid. Also, this unseparated region 5 connects the multiple filter parts of the filter element 1. As a result, even if one of the filter parts becomes blocked with dirt and the airflow resistance suddenly increases, some of this dirt will move through the unseparated region into other filter parts. Thus, the provision of the unseparated region makes it possible for the airflow resistance of all the filter parts to be equalized.

Furthermore, the filtering surface area is increased by the area of the surfaces in the unseparated region 5 that would have been stuck together had the unseparated region 5 not been provided.

Also, the sealant 200 is used to block the unseparated region 5 at the roll-finish end 19. This prevents fluid escaping from the unseparated region 5.

This embodiment also offers the same benefits as the 1st embodiment.

6th Embodiment

The roll filter paper 10 used in this embodiment, as shown in FIGS. 14–17, has an unseparated region 5 similar to that of the 5th embodiment. In rolling the roll filter paper 10, an outflow side grip type rolling claw 33 similar to that used in the 2nd embodiment is used.

Figure 14:
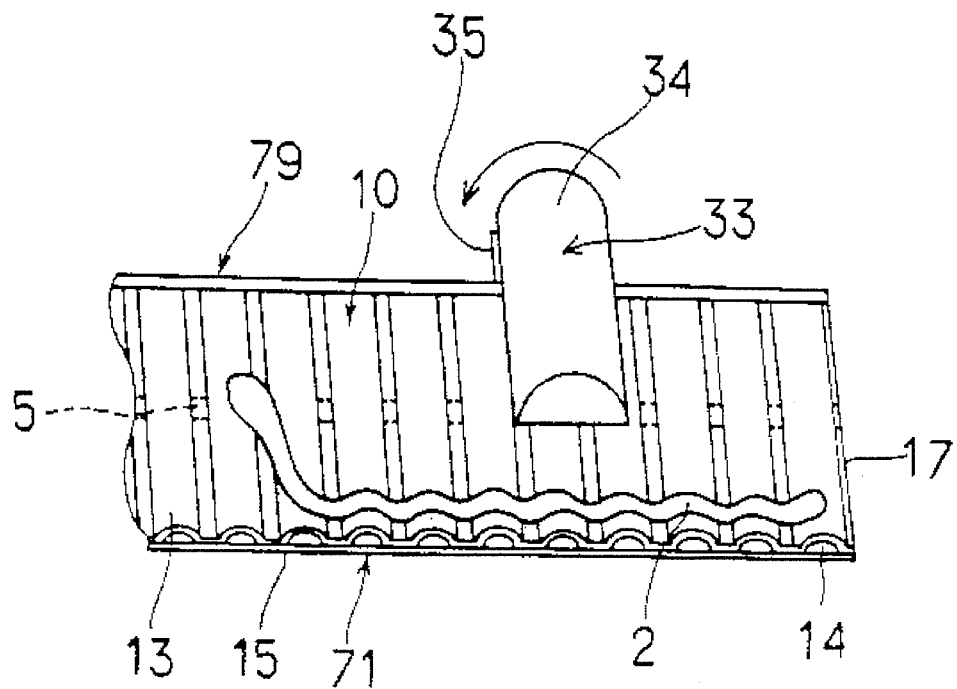
FIG. 14 is a view illustrating a roll filter paper rolling method according to a 6th preferred embodiment.

In making the filter element, as shown in FIG. 14, the roll-start end 17 of the roll filter paper 10 is gripped with the rolling claw 33. Next, the sealant 2 is applied so that it forms a strip, running longitudinally from the roll-start end 17, of a length corresponding to half a revolution of the rolling claw 33. The sealant 2 is then further applied so that it curves over to the center of the roll filter paper 10, until it is directly over the unseparated region 5.

Figure 15:
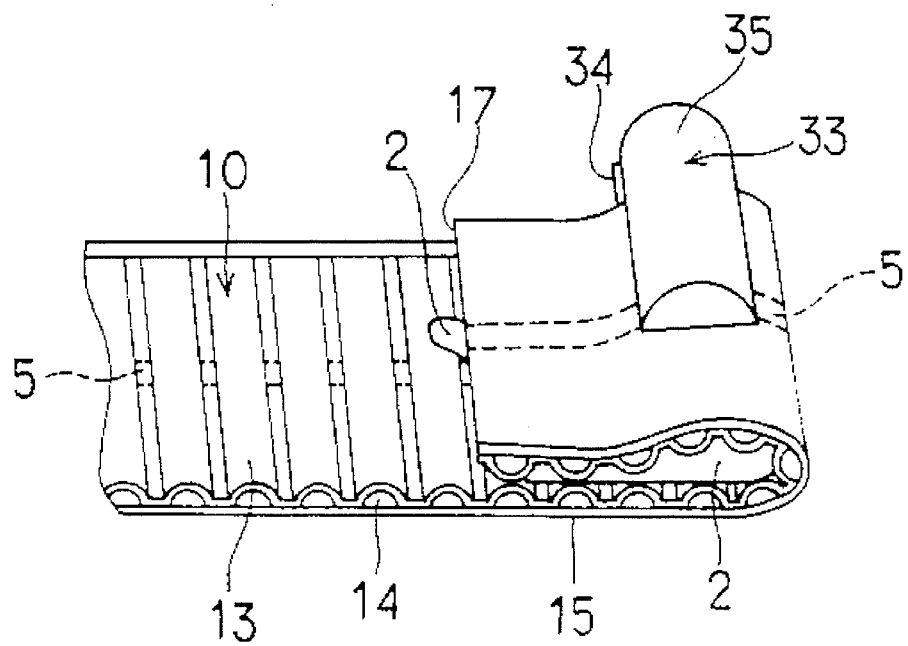
FIG. 15 is a view illustrating the continuation of the roll filter rolling method of FIG. 14.
Figure 16:
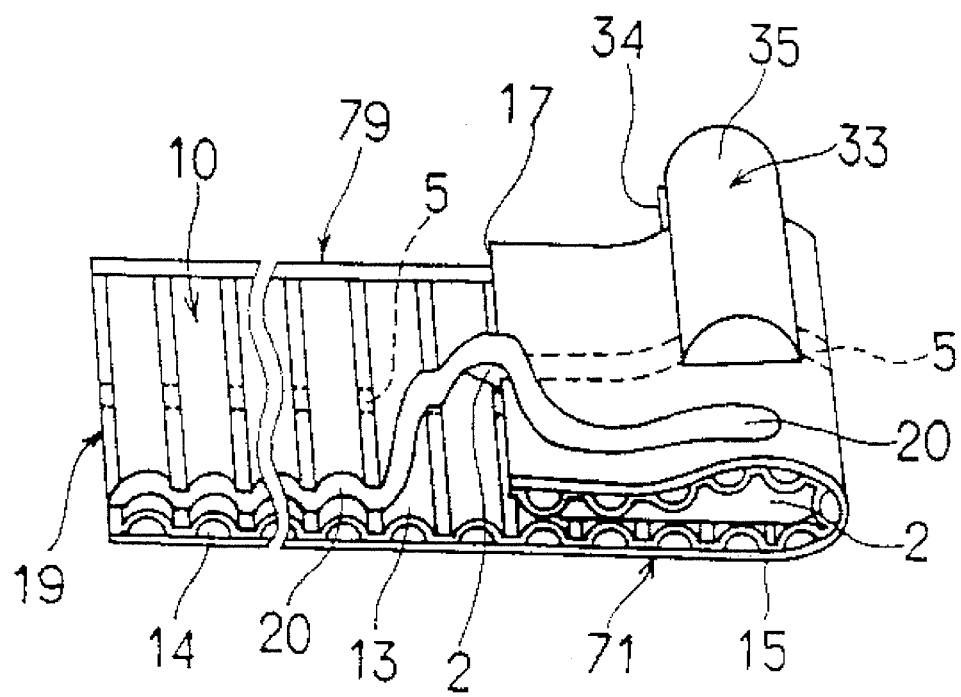
FIG. 16 is a view illustrating the continuation of the roll filter rolling method of FIG. 15.

Then, as shown in FIG. 15, the roll filter paper 10 is rolled through half a revolution by the rolling claw 33. In this way, the sealant 2 lying directly over the unseparated region 5 is left exposed, projecting out from under the roll-start end 17. Then, as shown in FIG. 16, the sealant 20 is applied longitudinally from the inflow side 71 of the end formed by the fold of the roll filter paper 10 to the roll-start end 17.

Then, the sealant 20 is laid in a curve running over to the center of the roll filter paper 10, the sealant is laid directly over the unseparated region 5, and then the sealant is made to form a curve running back to the inflow side 71.

Then, while the sealant 20 is applied longitudinally along the inflow side 71 all the way to the roll-finish end 19, the roll filter paper 10 is rolled with the rolling claw 33.

Figure 17:
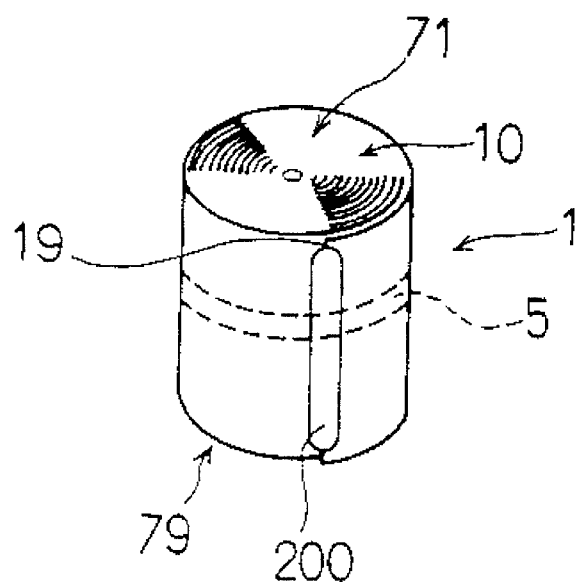
FIG. 17 is a perspective view of a filter element made according to the 6th preferred embodiment.

After that, the rolling claw 33 is removed from the roll filter paper 10, and, as shown in FIG. 17, the sealant 200 is applied to the entire length of the roll-finish end 19, including the unseparated region 5. This completes the filter element 1.

Other details of this embodiment are as per the 5th embodiment.

In this embodiment also, the benefits offered by the 5th embodiment can be obtained.

7th Embodiment

Figure 18:
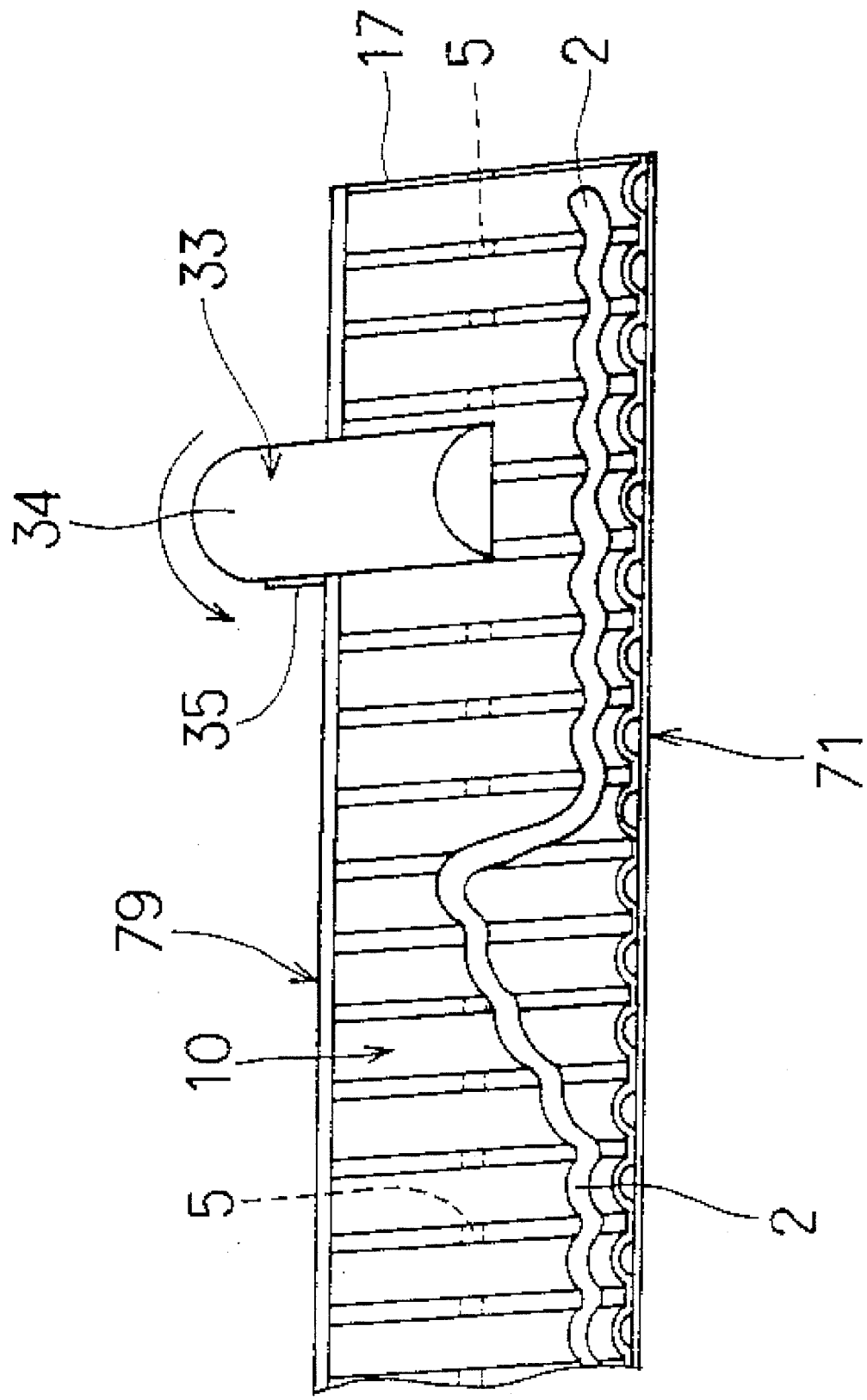
FIG. 18 is a view illustrating a roll filter paper rolling method according to a 7th preferred embodiment.

In this embodiment, as shown in FIG. 18, an output side grip type rolling claw 33 of the kind used in the 2nd embodiment is used to grip the roll-start end 17 of the roll filter paper 10. The sealant 2 is applied along the inflow side 71 of the roll filter paper 10, longitudinally from the roll-start end 17 to a length corresponding to half a revolution of the rolling claw 33.

Then, the sealant 2 is laid in a curve running over to the center of the roll filter paper 10, until it is laid directly over the unseparated region 5.

Next, without stopping, the sealant 2 is laid in a curve running back to the inflow side 71, and is applied along the inflow side 71 to the roll-finish end 19.

Other details of this embodiment are as per the 6th embodiment.

In this embodiment, the sealant 2 is laid from the roll-start end 17 to the roll-finish end continuously, without stopping. Therefore, the roll filter paper 10 can be rolled from the roll-start end 17 to the roll-finish end without changing the sealant 2 application position mid-way through rolling as in the 6th embodiment. Thus, a filter element can be made in a short space of time.

This embodiment also offers the same benefits as the 6th embodiment.

8th Embodiment

Figure 19:
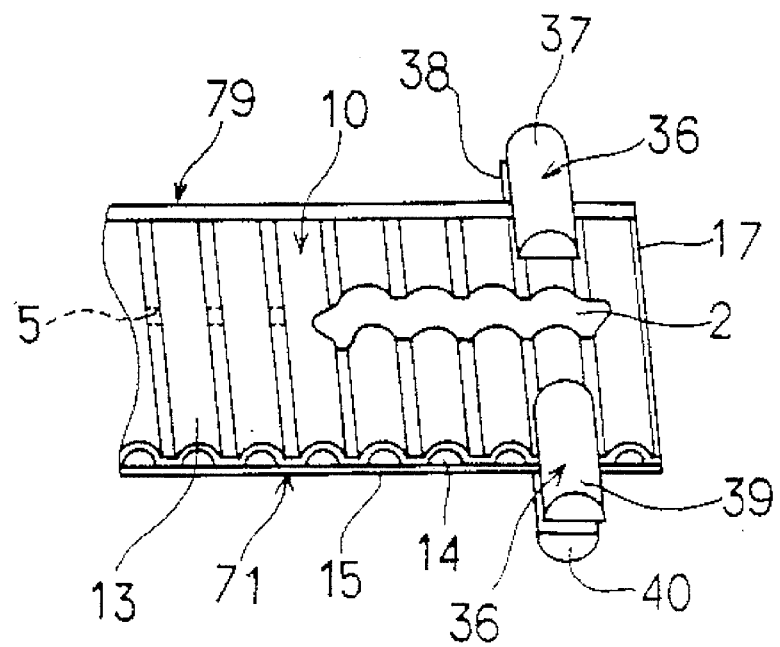
FIG. 19 is a view illustrating a roll filter paper rolling method according to an 8th preferred embodiment.
Figure 20:
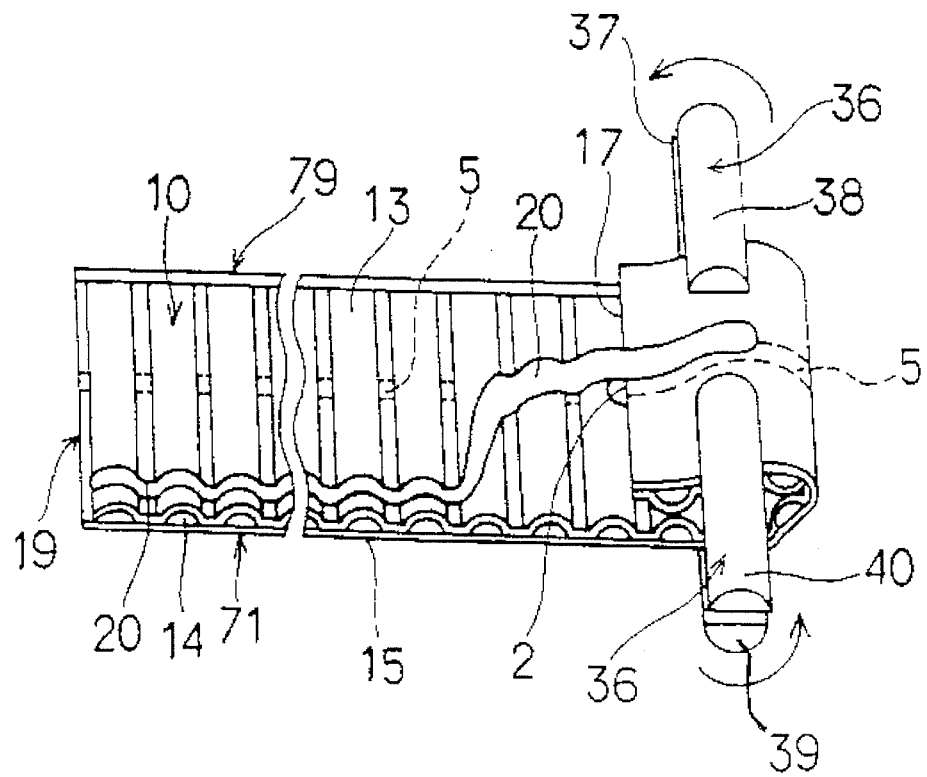
FIG. 20 is a view illustrating the continuation of the roll filter rolling method of FIG. 19.

In the filter element 1 of this embodiment, as shown in FIGS. 19 & 20, the roll filter paper 10 has an unseparated region 5 as in the 5th embodiment. Side grip type rolling claws 36 of the kind used in the 3rd embodiment are used to roll the roll filter paper 10 in this embodiment.

In making the filter element 1, as shown in FIG. 19, the roll-start end 17 of the roll filter paper 10 is gripped with the rolling claws 36. Then, the sealant 2 is applied longitudinally and centrally from the roll-start end 17 to the length corresponding to half a revolution of the rolling claw 36.

Next, as shown in FIG. 20, the roll filter paper 10 is rolled through half a revolution using the rolling claws 36. This leaves a small area of the sealant 2 directly over the unseparated region 15 exposed, projecting out from under the folded roll-start end 17.

Then, the sealant 20 is applied to the outer surface of the roll filter paper 10 between the rolling claws 36, and laid over the exposed portion of the sealant 2. Then, while the sealant 20 is continuously laid in a curve running over to the inflow side 71, and is laid along the inflow side 71 to the roll-finish 19, the roll filter paper 10 is rolled up by the rolling claws 36.

After that, the rolling claws 36 are removed from the roll filter paper 10, and the sealant 200 is applied to the entire length of the roll-finish end 19, including the unseparated region 5 (see FIG. 17). This completes the filter element 1.

Other details of this embodiment are as per the 5th embodiment.

This embodiment offers the same benefits as the 5th embodiment.

9th Embodiment

Figure 21:
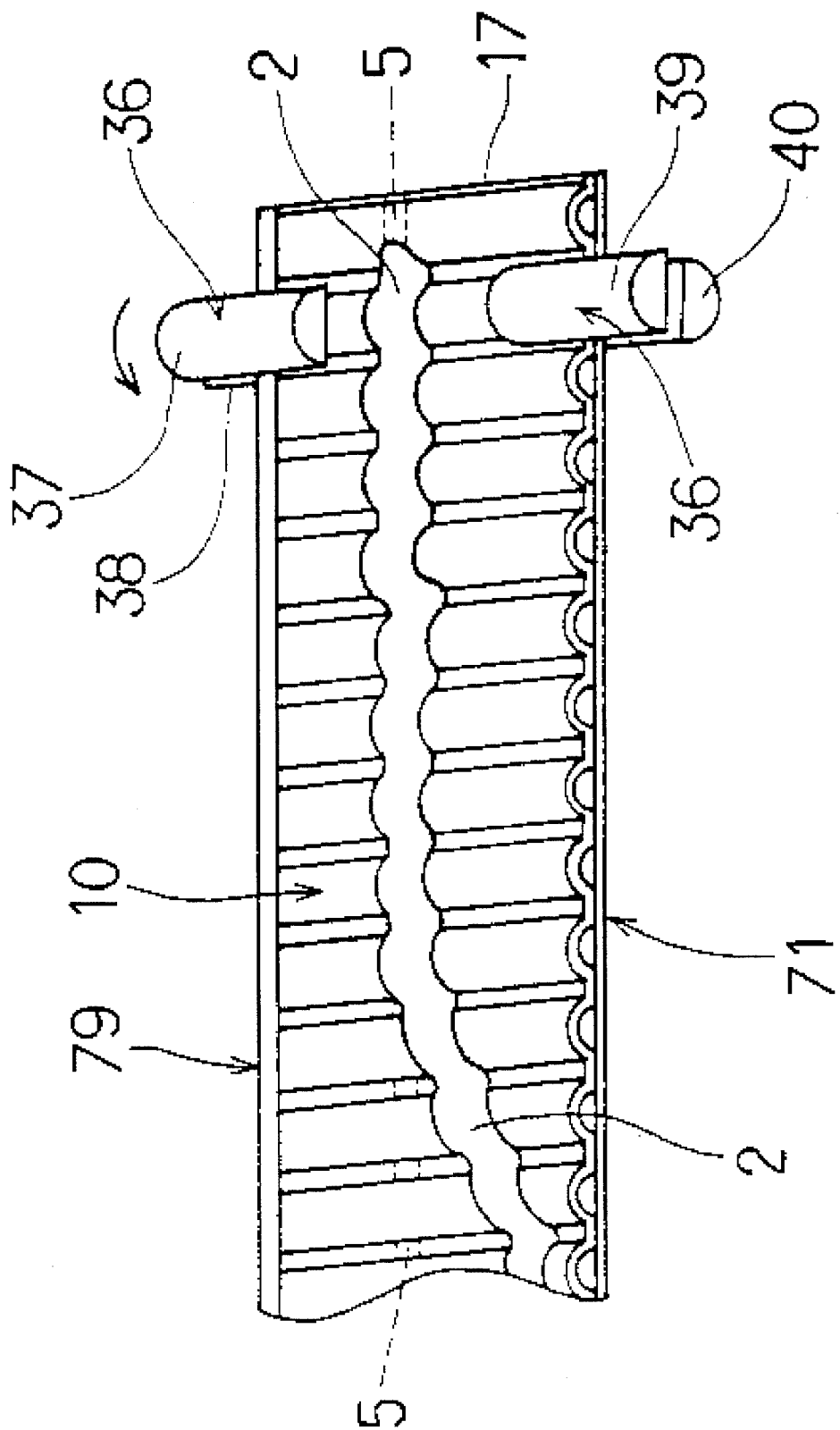
FIG. 21 is a view illustrating a roll filter paper rolling method according to a 9th preferred embodiment.
Figure 22:
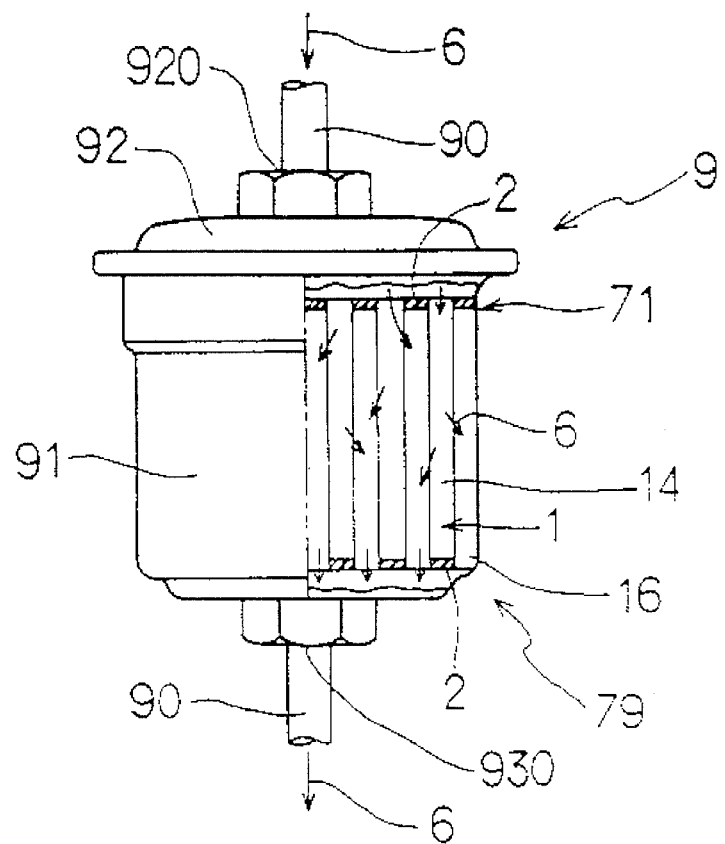
FIG. 22 is a semi-cross-sectional view of a fuel filter containing a conventional filter element.
Figure 23:
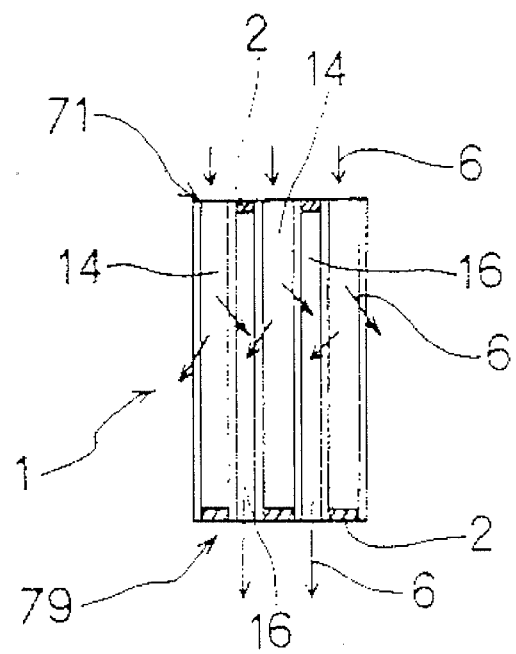
FIG. 23 is a view illustrating the operation of a conventional filter element.
Figure 24:
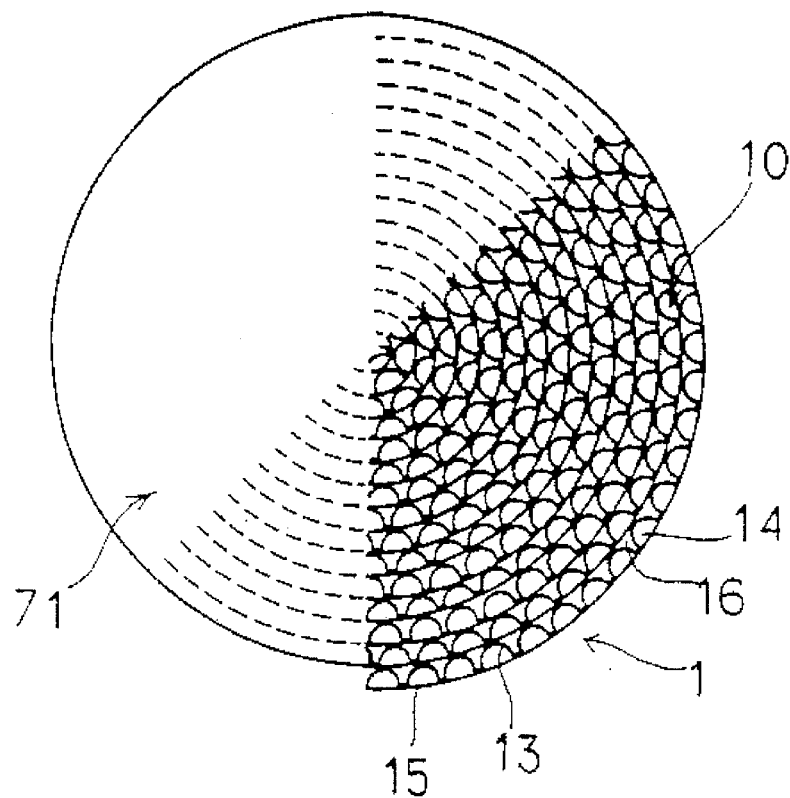
FIG. 24 is a plan view of the inflow end of a conventional filter element.

In this embodiment, as shown in FIG. 21, the rolling claws 36 are used to grip the sides of the roll filter paper 10 without gripping the unseparated region 5. With the roll filter paper gripped in this way, the sealant 2 is laid along the unseparated region 5, starting from the roll-start end 17, and from a mid-way point is gradually led over to the inflow side 71 of the roll filter paper 10, and is laid along the inflow side 71 to the roll-finish end.

The length of the strip of the sealant 2 that is laid over the unseparated region 5 corresponds to about 1 revolution of the rolling claws 36.

Next, the rolling claws 36 are rotated and the roll filter paper 10 is completely rolled up. After that, the rolling claws are removed from the roll filter paper 10.

Other details are as per the 8th embodiment.

In this embodiment, the sealant 2 is laid from the roll-start end 17 to the roll-finish end continuously, without stopping. As a result, the roll filter paper 10 can be rolled from the roll-start end 17 to the roll-finish end continuously, without stopping.

Therefore, in this embodiment, a filter element can be made in a short space of time.

This embodiment also provides the same benefits as those of the 8th embodiment.

What is claimed is:

1. A manufacturing method for manufacturing a filter element by rolling a roll filter paper having a latitudinally oriented filter part for filtering, one end of said filter part being open and the other end being sealed, said manufacturing method comprising the steps of: gripping only the side of said roll filter paper corresponding to said closed end of said filter part with a rolling claw near the roll-start end;

applying a sealant in a narrow longitudinal strip along the side of said roll filter paper corresponding to said open end of said filter part, starting near said roll-start end;

rolling up said roll filter paper using said rolling claw; and after rolling up said roll filter paper, removing said rolling claw.

2. A method for manufacturing a filter element by rolling a roll filter paper having a latitudinally oriented filter part for filtering, one end of said filter part being open and the other end being sealed, said manufacturing method comprising the steps of:

gripping said roll filter paper with a rolling claw near the roll-start end;

applying a sealant to the surface of said roll filter paper in a narrow strip running longitudinally along said roll filter paper and starting at a predetermined distance from said rolling claw where said sealant does not make contact with said rolling claw;

rolling up said roll filter paper using said rolling claw;

after rolling up said roll filter paper, removing said rolling claw;

applying a sealant to a cavity in the rolled up roll filter paper from which said rolling claw was removed;

wherein the step of gripping the roll filter paper includes gripping one side of said roll paper with the rolling claw near the roll start end in such a way that one portion of predetermined size is not gripped by said rolling claw; and wherein the step of applying sealant to the surface of the roll filter includes providing the adhesive in a narrow strip starting from said ungripped portion near said roll-start end of said roll filter paper and applying sealant in the longitudinal strip along the side of said roll filter paper corresponding to said filter part in a continuous process.

3. A method for manufacturing a filter element according to claim 2, wherein said filter part of said roll filter paper comprises multiple filter parts formed by a corrugated sheet and a flat sheet, and said multiple filter parts are separate and independent of each other.

4. A method for manufacturing a filter element by rolling a roll filter paper having a latitudinally oriented filter part for filtering, one end of said filter part being open and the other end being sealed, the method comprising the steps of:

gripping said roll filter paper with a rolling claw near the roll-start end in such a way that one portion of predetermined size is not gripped by said rolling claw;

applying a sealant to the surface of the filter paper in a narrow longitudinal strip starting from the un-gripped portion near said roll-start end of said roll filter paper, and, after applying said sealant in the longitudinal strip, applying sealant along the side of said roll filter paper corresponding to said open end of said filter part;

rolling-up said roll filter paper using said rolling claw; and after rolling-up said roll filter paper, removing said rolling claw.

* * * * *

UNITED STATES PATENT AND TRADEMARK OFFICE
CERTIFICATE OF CORRECTION

PATENT NO. : 5,543,007
DATED : August 6, 1996
INVENTOR(S) : TAKAGAKI et al

It is certified that error appears in the above-indentified patent and that said Letters Patent is hereby corrected as shown below:

On the title page:

Please change:

"[30]     Foreign Application Priority Data

June 17, 1992    [JP]    Japan . . . . . . . . 4-184505 to   —[30]     Foreign Application Priority Data

June 17, 1992    [JP]    Japan . . . . . 4-184505
    Feb, 15 1993    [JP]    Japan . . . . . 5-049984 —

Signed and Sealed this

Twenty-sixth Day of August, 1997

*Attest:*

BRUCE LEHMAN

*Attesting Officer*      *Commissioner of Patents and Trademarks*